US008375009B2

(12) United States Patent
Shrufi et al.

(10) Patent No.: US 8,375,009 B2
(45) Date of Patent: Feb. 12, 2013

(54) SCALABLE AND EXTENSIBLE FRAMEWORK FOR DATA-DRIVEN WEB SERVICES

(75) Inventors: Adel Shrufi, Seattle, WA (US); Gregory E. Ozawa, Redmond, WA (US); Teresa Ostle, Issaquah, WA (US); Jeffrey Wallis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 12/855,189

(22) Filed: Aug. 12, 2010

(65) Prior Publication Data

US 2012/0041991 A1 Feb. 16, 2012

(51) Int. Cl.
*G06F 7/00* (2006.01)
(52) U.S. Cl. ........................................ 707/694; 717/116
(58) Field of Classification Search .................. 707/694, 707/792; 717/116, 102
See application file for complete search history.

(56) References Cited

U.S. PATENT DOCUMENTS

| 7,089,560 | B1 | 8/2006 | Uhler et al. |
| 7,698,398 | B1 | 4/2010 | Lai |
| 2002/0046240 | A1 | 4/2002 | Graham et al. |
| 2003/0236824 | A1 | 12/2003 | Alsafadi et al. |
| 2006/0069702 | A1* | 3/2006 | Moeller et al. ............... 707/200 |
| 2006/0195476 | A1 | 8/2006 | Nori et al. |
| 2007/0124006 | A1 | 5/2007 | Tucker et al. |
| 2008/0263055 | A1* | 10/2008 | Kumar et al. .................. 707/10 |
| 2008/0282219 | A1* | 11/2008 | Seetharaman et al. ........ 717/101 |
| 2011/0107231 | A1* | 5/2011 | Gueldemeister ............. 715/745 |

OTHER PUBLICATIONS

Parry, Dominic Charles, "CREWS: A Component-driven, Run-time Extensible Web Service Framework", Retrieved at <<http://eprints.ru.ac.za/74/1/Parry-MSC.pdf>>, Dec. 2003, pp. 103.
Fensel, et al., "The Web Service Modeling Framework WSMF", Retrieved at <<http://www.cs.umbc.edu/courses/691s/papers/wsmf.paper.pdf>>, Jun. 14, 2010, pp. 1-33.
"Web-Tier Application Framework Design", Retrieved at <<http://java.sun.com/blueprints/guidelines/designing_enterprise_applications_2e/web-tier/web-tier5.html>>, Retrieved Date: Jun. 14, 2010, pp. 20.

* cited by examiner

*Primary Examiner* — Amy Ng
(74) *Attorney, Agent, or Firm* — Turk IP Law, LLC

(57) ABSTRACT

A layered architecture for a web service is provided with a data tier, object representation, data transformation, and a service tier. Scalability is achieved by relying on relatively high degree of decoupling, lightweight data interaction, and reducing overhead of transaction demands. Custom web services can be built on top and leverage the capabilities of the flexible framework including lightweight transaction support, event-based business logic extensibility, and efficient data contract binding.

20 Claims, 7 Drawing Sheets

SCALABLE AND EXTENSIBLE FRAMEWORK FOR DATA-DRIVEN WEB SERVICES

BACKGROUND

Web services provide computing operations executed on remote systems through application programming interfaces (API) or web APIs typically accessed via Hypertext Transfer Protocol (HTTP) to local computing devices without the burden of users having to install, update, and manage local applications for the same operations. Standardized protocols may be utilized in facilitating interactions between remote systems providing a web service of local computing devices of users such as Simple Object Access Protocol (SOAP) relying on extensible markup language (XML) for messaging format and application layer protocols (e.g. HTTP).

Web services include a wide range of computer applications from audio/video exchanges to complicated business applications. Thus, the architecture and functionality of various web service types tend to be distinct. Especially in a business application environment, multiple parties may be involved in development, management, and consumption of the services. It is a common occurrence for comprehensive business services to have a number of modules prepared by third parties to operate alongside the core service.

In a complex business application environment, the nature of the web service's architecture may determine success of the web service affecting user experience, ease and variety of provided services, quality of service (e.g. problems, efficiency, etc.), and other characteristics. For example, conventional systems typically coordinate multiple connections into a single homogeneous connection, which may result in increased use of resources, computation time, overhead, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to layered architecture for a web service including data tier, object representation, data transformation, and a service tier. Scalability may be achieved in such an architecture by relying on relatively high degree of decoupling, lightweight data interaction, and reducing overhead of transaction demands. Furthermore, through a flexible framework, custom web services may be built on top and leverage the capabilities of the framework including lightweight transaction support, event-based business logic extensibility, and efficient data contract binding.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
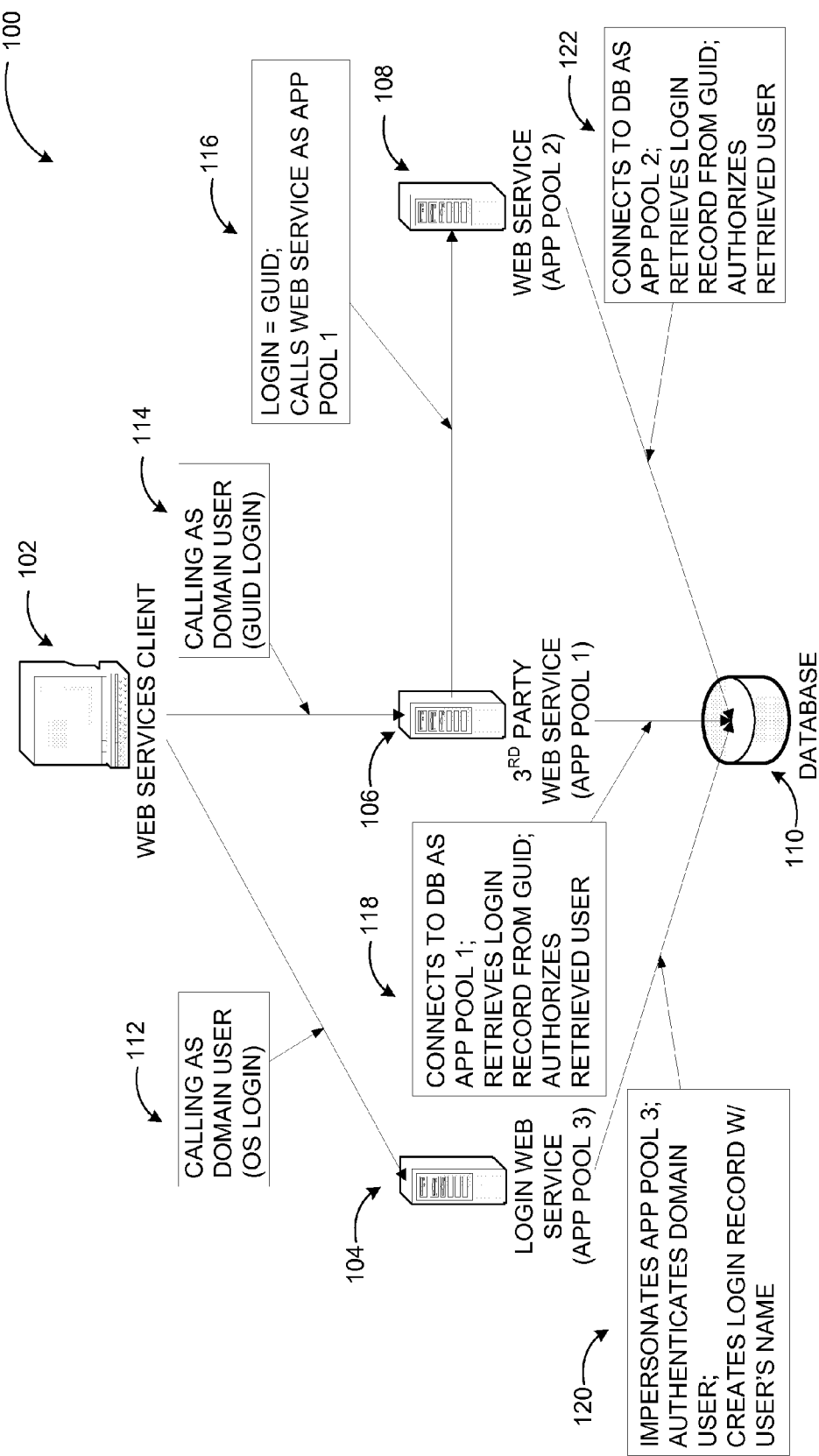
FIG. 1 illustrates how a consumer can gain access to a web service according to embodiments.

As briefly described above, a layered architecture may be provided for a web service with a data tier, object representation, data transformation, and a service tier. Through a relatively high degree of decoupling, lightweight data interaction, and reducing overhead of transaction demands, scalability may be achieved. Custom web services may be built on top and leverage the capabilities of the flexible framework including lightweight transaction support, event-based business logic extensibility, and efficient data contract binding. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing business applications through web services.

Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

FIG. 1 illustrates how a consumer gains access to a web service according to embodiments in diagram 100. A consumer using a web services client 102 may access the service by providing an operating system login (112) or a global user identifier (GUID) (114).

According to the first scenario, where the consumer calls with an operating system login (112) to a login web service 104, the login web service 104 impersonates an application pool (e.g. application pool 3), authenticates the domain user (consumer), and creates login records with the user's name (120) providing connectivity to database 110.

According to the second scenario, where the web service client calls third party web service 106 as domain user with a GUID login (114), the third party web service may connect to database 110 as another application pool (e.g. application pool 1), retrieve login record from GUID, and authorize the retrieved user (118). According to the same scenario, third party web service 106 may also connect to web service 108 with the GUID login calling the web service 108 as application pool 1 (116). Web service 106, which is part of application pool 2, may connect to database 110 as application pool 2, retrieve login records from GUID, and authorize the retrieved user (122) in response to the call from third party web service 106.

A system according to embodiments may utilize a security object to support the above described models. The security object may expose the different login methods. One method may create sessions for the operating system user model, while another method creates sessions for the web service user model.

Figure 2:
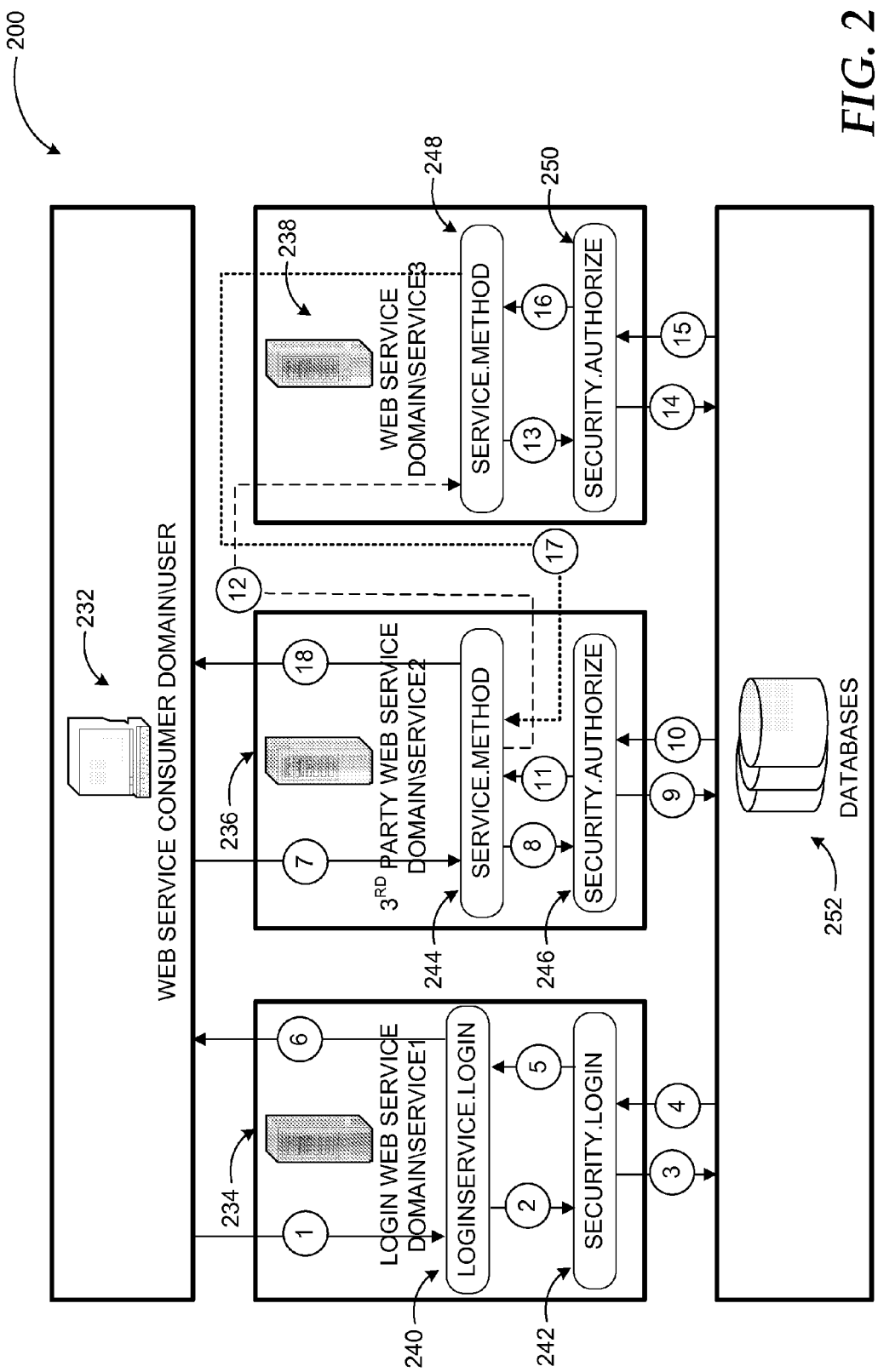
FIG. 2 illustrates a sequence of events that occur as a consumer utilizes a web service according to embodiments in an example scenario.

FIG. 2 illustrates a sequence of events that occur as a consumer utilizes a web service according to embodiments in an example scenario. Security in a web service according to embodiments is split between authentication (e.g. a web service session) and authorization, which may be performed with other security-related functionality by a singleton-per-service-instance security object. This class may be exposed to external callers. To prevent unauthorized callers from running a web service method, such a security.authorize method (246, 250) may be the only exposed piece of code in the framework which loads and applies the web services session context. Web service methods may call security.authorize as early as possible to prevent errors from occurring if database I/O is attempted prior to applying the session context.

The sequence of events may begin with web service consumer 232 calling login web service 234 as domain\user (event 1). In response loginservice.login 240 may call security.login 242 (event 2), which may create a new web service session by inserting a web service access row in database(s) 252 (event (3). Then, security.login 242 may retrieve the new session's identifier (event 4) from database(s) 252 and return to loginservice.login 240 (event 5). Loginservice.login 240 returns the session identifier to the consumer at event 6.

Web service consumer 232 may then call service.method 244 of third party web service 236 as domain\user (event 7). Service.method 244 may call security.authorize method 246 at event 8, which retrieves the session from database(s) 252 at events 9 and 10, and return the session to service.method 244 at event 11. Service.method calls service.method 248 of web service (domain service 3) 238 as domain\service 2 on behalf of domain\user (event 12).

Service.method 248 calls security.authorize method 250 of web service 238 at event 13, which follows the authorization process retrieving the session from database(s) 252 at events 14 and 15. Service.authorize method 250 returns the session to service.method 248 at event 16, which processes the session and returns to service.method 244 of third party web service 236 at event 17. Service.method 244 processes the received session and returns to the consumer 232.

Figure 3:
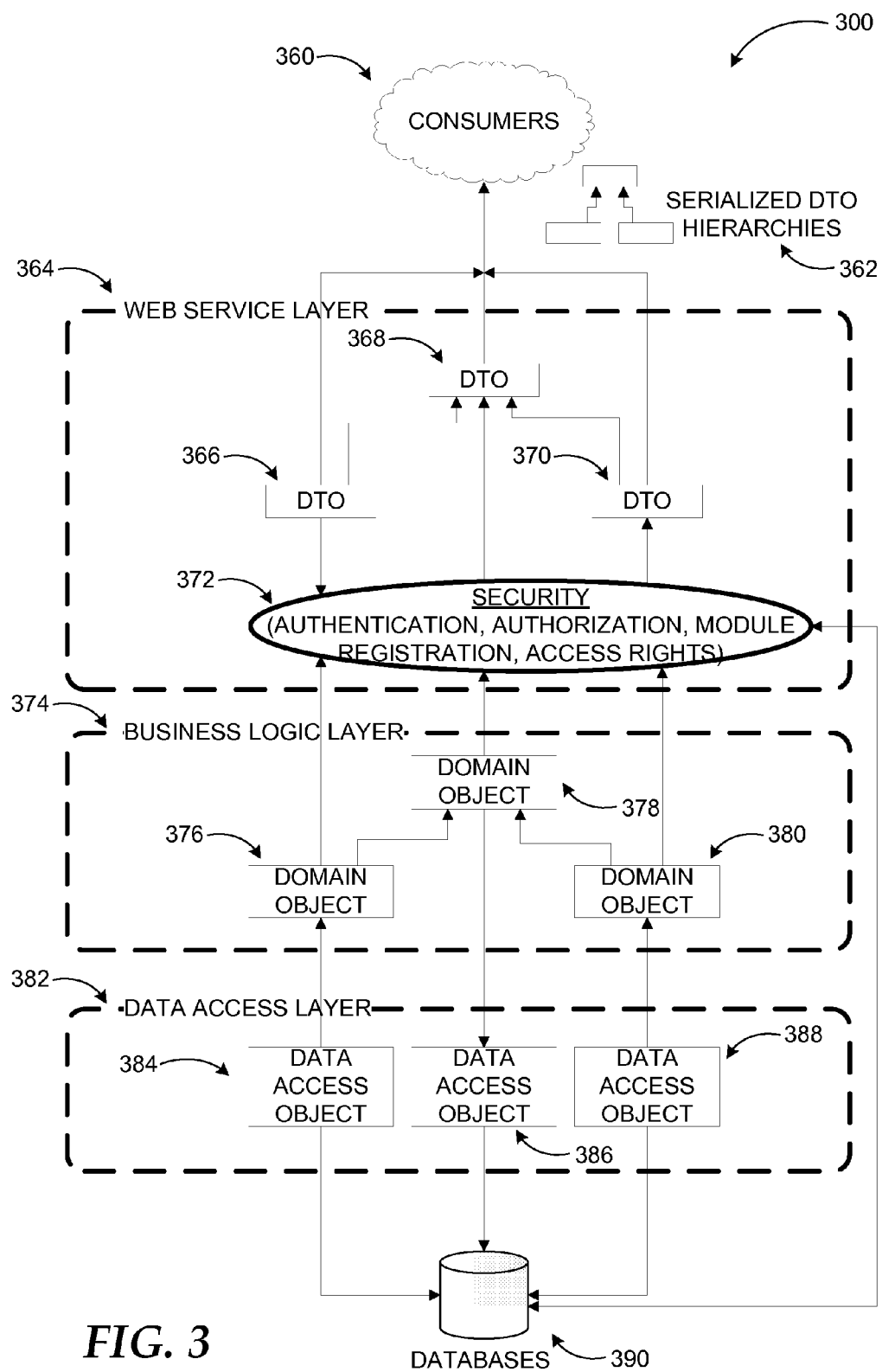
FIG. 3 illustrates an overview of the conceptual layers involved in a web service according to embodiments.

FIG. 3 illustrates an overview of the conceptual layers involved in a web service according to embodiments. A web services framework according to embodiments may include a web service layer 364, a business logic layer 374, and a data access layer 382 as shown in diagram 300. Such a system utilizes serialized data transfer object (DTO) hierarchies 362 in facilitating interactions between consumers 360 and the web services. Web service layer 364 may include security processes 372 such as authentication, authorization, module registration, and access rights management.

A domain object (DO) (376, 378, and 380) is a strongly-typed representation of a database record. DOs may be organized into a hierarchy containing conceptually-related domain objects. DOs may also expose methods that apply the business logic in business logic layer 374. DOs are the lowest-level objects which reflect a hierarchy. Thus, they define the hierarchy. Higher-layer objects may omit parts of the Domain Object hierarchy, but do not add to it.

Data Access Objects (DAOs) (384, 376, and 388) are adapters that encapsulate exactly one database table or view, providing interfaces to perform Create, Read, Update, Delete (CRUD) operations on records from the table (or Read from the view). Each Data Access Object type may populate one corresponding Domain Object type (e.g. DAO 384 populates DO 376, DAO 388 populates DO 380, etc.). For each DO type, there exists one DAO type (e.g. DAO 386 for DO 378).

Data Transfer Objects (DTOs) (366, 368, and 370) are the consumer-facing representations of Domain Objects. They are intended to provide consumers with easily-consumed, strongly-typed object hierarchies whose schema is decoupled from that of the underlying Domain Object. DTOs represent the data contracts of a web service. Like DOs, DTOs are arranged in hierarchies (362).

A web service session is an abstract conversation between a web service consumer and one or more web services. A web service session begins when the consumer is authenticated by the login web service and may end when the consumer calls the login web service's logout method or when a timeout period elapses. Any user may begin a web service session and may have multiple sessions concurrently.

The "session user" is the identity presented by a web service consumer to initiate a web service session, and may be either an authenticated operating system account or a web service user account. Each session user may have multiple concurrent web service sessions. If the session user is a web service user, then the consumer's operating system user identity needs to have permission to log in as that web service user. The session user's access rights may be evaluated when a web service method is called (the user receives the union of all associated web service users' access rights when executing web methods).

A service account is the least-privileged, non-interactive operating system account under which a web service executes. The service account needs to have rights to connect to database(s) 390, to perform CRUD on the database tables and views, and to execute stored procedures. These rights may be granted by assigning the service account to the database roles. To prevent rogue processes from gaining database access, the service account credentials may be well-protected such as through a password protection process.

Figure 4:
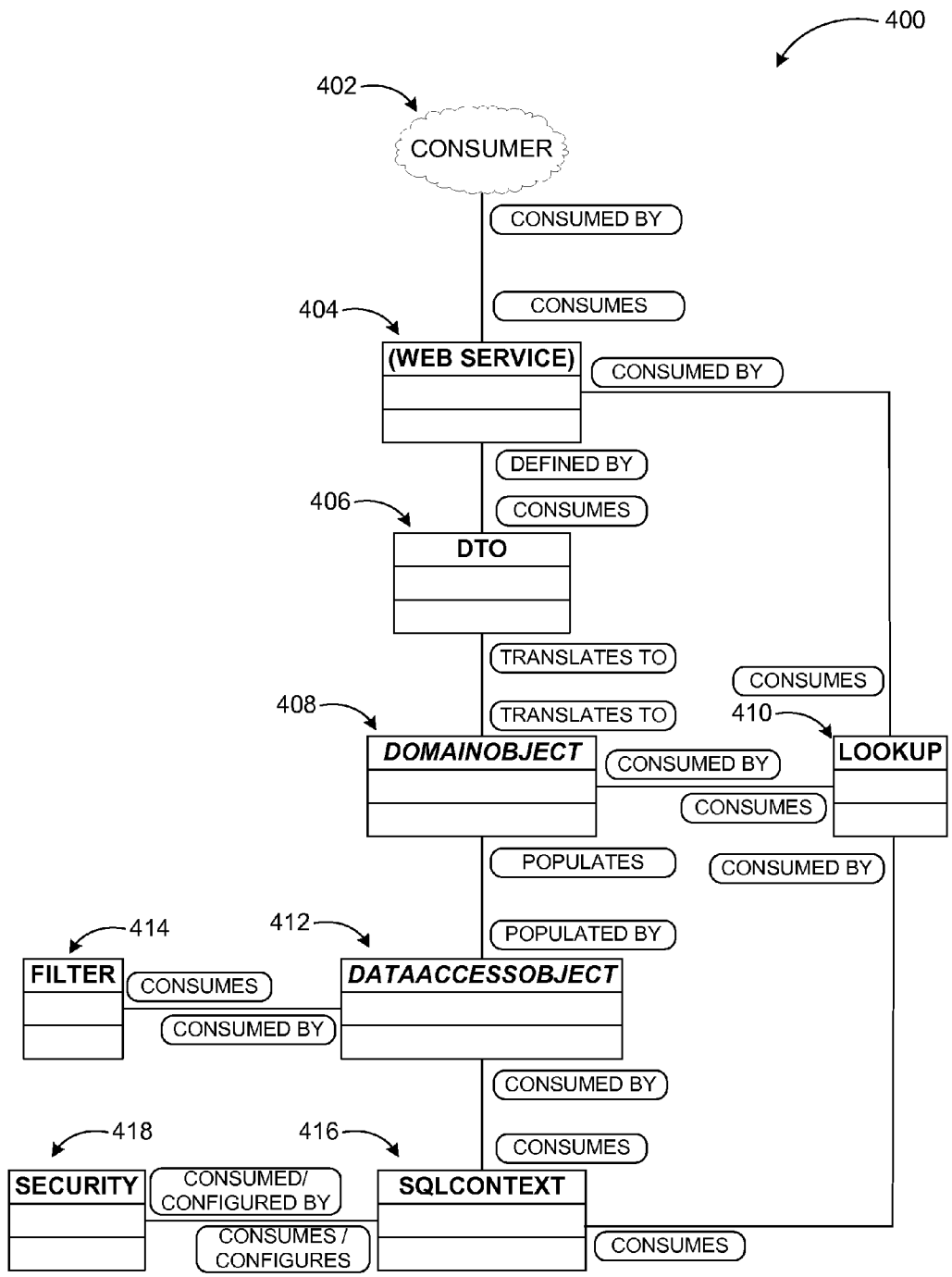
FIG. 4 illustrates an entity relational diagram of the objects involved in a web service according to embodiments.

FIG. 4 illustrates an entity relational diagram of the objects involved in a web service according to embodiments. Data in business application tend to be composed of hierarchies that abstract real world entities, which present a real scalability challenge when this kind of data needs to be exposed through a web service. Additionally, these web services are transactional in nature, which exacerbates the scalability and overhead problems. A system according to embodiments relies on a layered architecture, as discussed previously, achieving the decoupling of tiers and reducing the overall demands on shared resources such as the database thereby resulting in enhanced performance.

A web services framework according to embodiments includes several parts. The primary part is a framework assembly, which exposes the base classes upon which web services can be built. The assembly may also include two login web services and a lookup web service built on the framework. In addition, the framework may include new system manager applications, changes to existing system manager applications, and changes to a system manager report. The framework may even deliver a command-line utility.

The SQL context 416 is a singleton-per-service-instance class that manages database server connections and executes database commands. It is consumed by the base class DAO 412, the lookup class (410), derived DOs 408, and web services 404. Each SQL context 416 (and thus, each instance of a web service) may have up multiple open connections to an application database at any given time (e.g. one enlisted to a transaction and one not). DTO 406 is transferred between consumer 402 and backend of the system.

SQL context 416 may use non-public, synchronous methods to manage database connections and to execute database commands. Its constructor may not be exposed outside the framework assembly. Web services 404 may access its underlying connection objects indirectly. Methods of the SQL context class may indicate errors by throwing an exception.

Each web service may perform database-related functionality (CRUD, lookups 410, security 418, filters 414, etc.) in a Try-Finally or Try-Catch-Finally block. To support system database I/O needs, application programming interfaces (APIs) may be added to expose appropriate connection objects. As mentioned above, Data Access Objects 412 are adapters that map a Domain Object 408 to its underlying database table or view. DAO methods are called by DOs to perform CRUD after business logic is applied. DAOs 412 may not have knowledge of object hierarchies. As such, relationships are not defined at the database level. The DAO class may be exposed outside the framework assembly. Each type of DAO 412 consumes one type of DO 408, and is consumed by the same type of DO.

In addition, the DAO class may use private members to consume SQL context 416 for all database I/O. Derived DAO classes may not consume SQL context 416 except to expose additional I/O methods beyond typical CRUD. When a CRUD method is called, the base class may get the appropriate database command from a property; open the database connection if not already opened; execute the database command; and close the database connection if the database connection was closed before step the database connection is opened. A system according to embodiments may interact with any data source such as a relational database, an OLAP database, tabular list, etc.

While the example systems in FIG. 1 through FIG. 4 have been described with specific elements and interactions, embodiments are not limited to these configurations and can be implemented with other components and configurations. Furthermore, embodiments are not limited to illustrated hierarchies or specific data sources. Any form of data and data sources may be used for a scalable and extensible web service architecture using the principles described herein.

Figure 5:
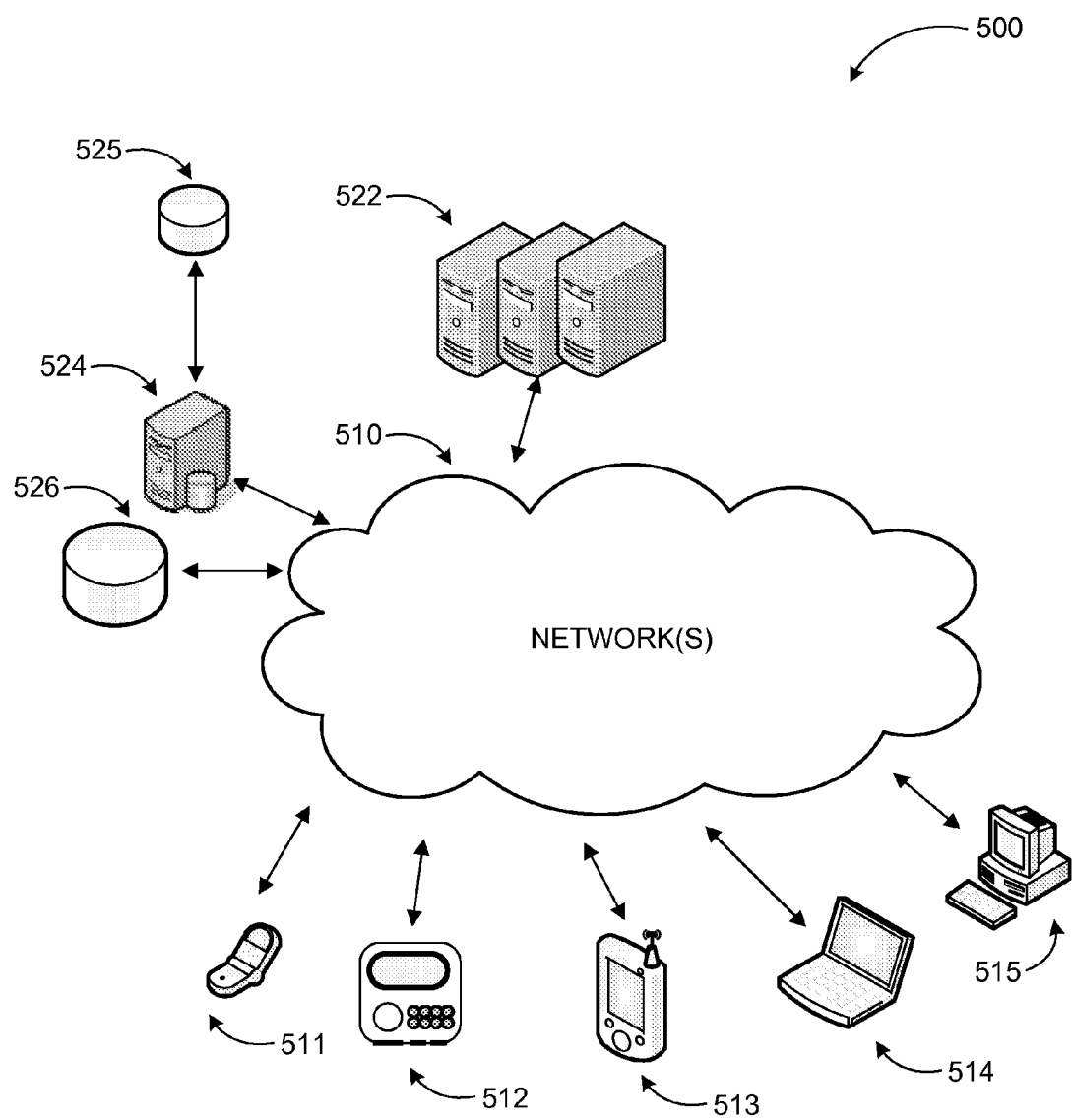
FIG. 5 is a networked environment, where a system according to embodiments may be implemented.

FIG. 5 includes diagram 500 of an example networked environment, where embodiments may be implemented. A platform providing a layered web service framework may be implemented via software executed over one or more servers 522 such as a hosted service. The platform may communicate with consuming applications on individual computing devices such as a cellular phone 511, smart automobile console 512, a handheld computer 513, a laptop computer 514, and desktop computer 515 (client devices') through network(s) 510.

Client devices 511-515 are capable of communicating with a web service providing a business application, for example. Implementing a scalable and extensible layered framework, the web service may store and retrieve data associated with the business application in/from individual data sources such as data store 526 or data sources managed by a database server such as data store 525 managed by database server 524.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also comprise a plurality of distinct networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a layered framework for a scalable and extensible web service architecture. Furthermore, the networked environments discussed in FIG. 5 are for illustration purposes only. Embodiments are not limited to the example applications, modules, or processes.

Figure 6:
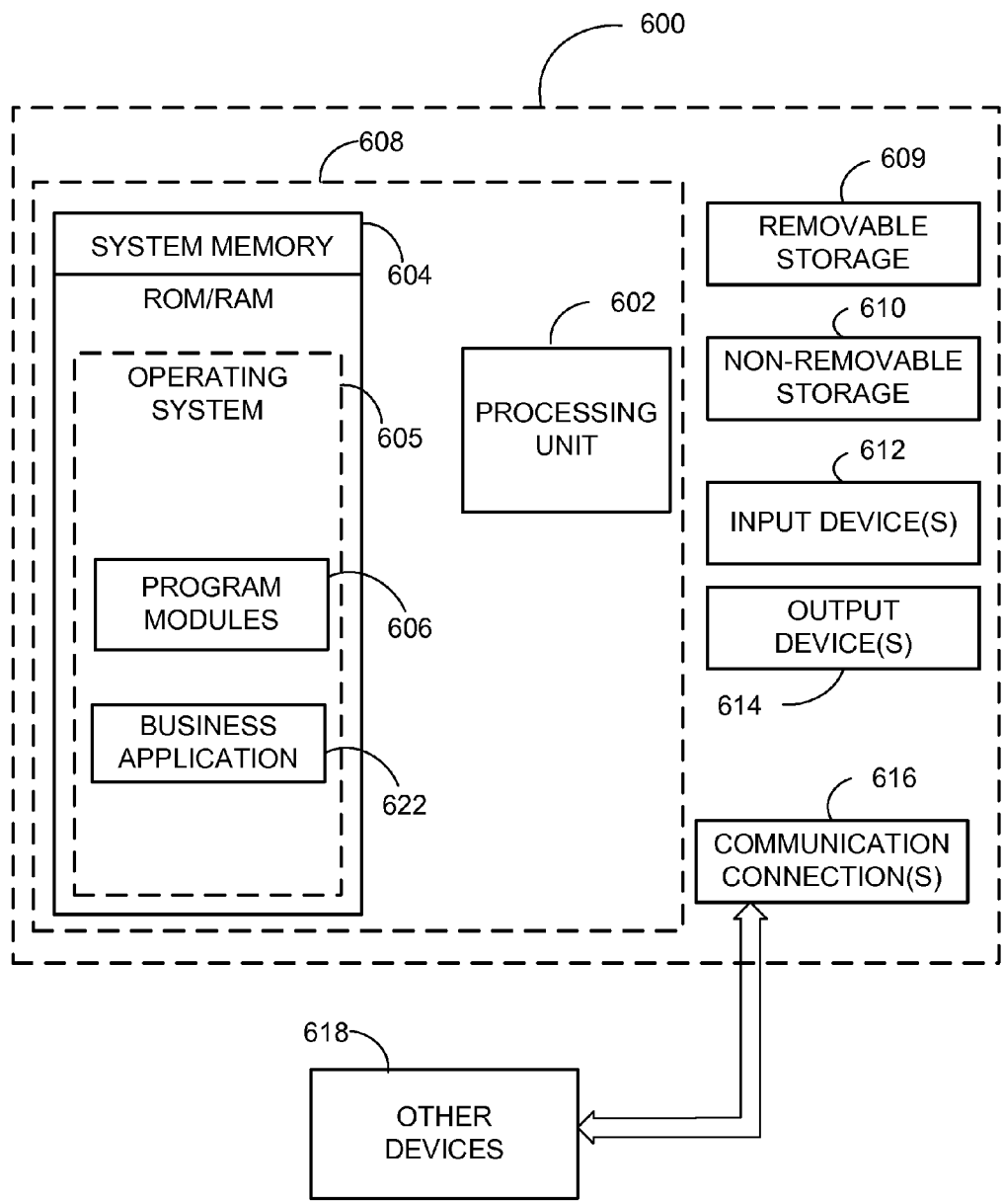
FIG. 6 is a block diagram of an example computing operating environment, where predictive data caching according to embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computer 600. In a basic configuration, computer 600 may be a server executing a web service and include at least one processing unit 602 and system memory 604. Computer 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606 and business application 622.

Business application 622 may be a separate module or an integrated part of a web service providing data retrieval, analysis, and/or similar services. Business application 622 may provide remote users requested services through a layered architecture as discussed in more detail above. This basic configuration is illustrated in FIG. 6 by those components within dashed line 608.

Computer 600 may have additional features or functionality. For example, the computer 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 600. Any such computer readable storage media may be part of computer 600. Computer 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computer 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, provide data for data processing application 622, and so on. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
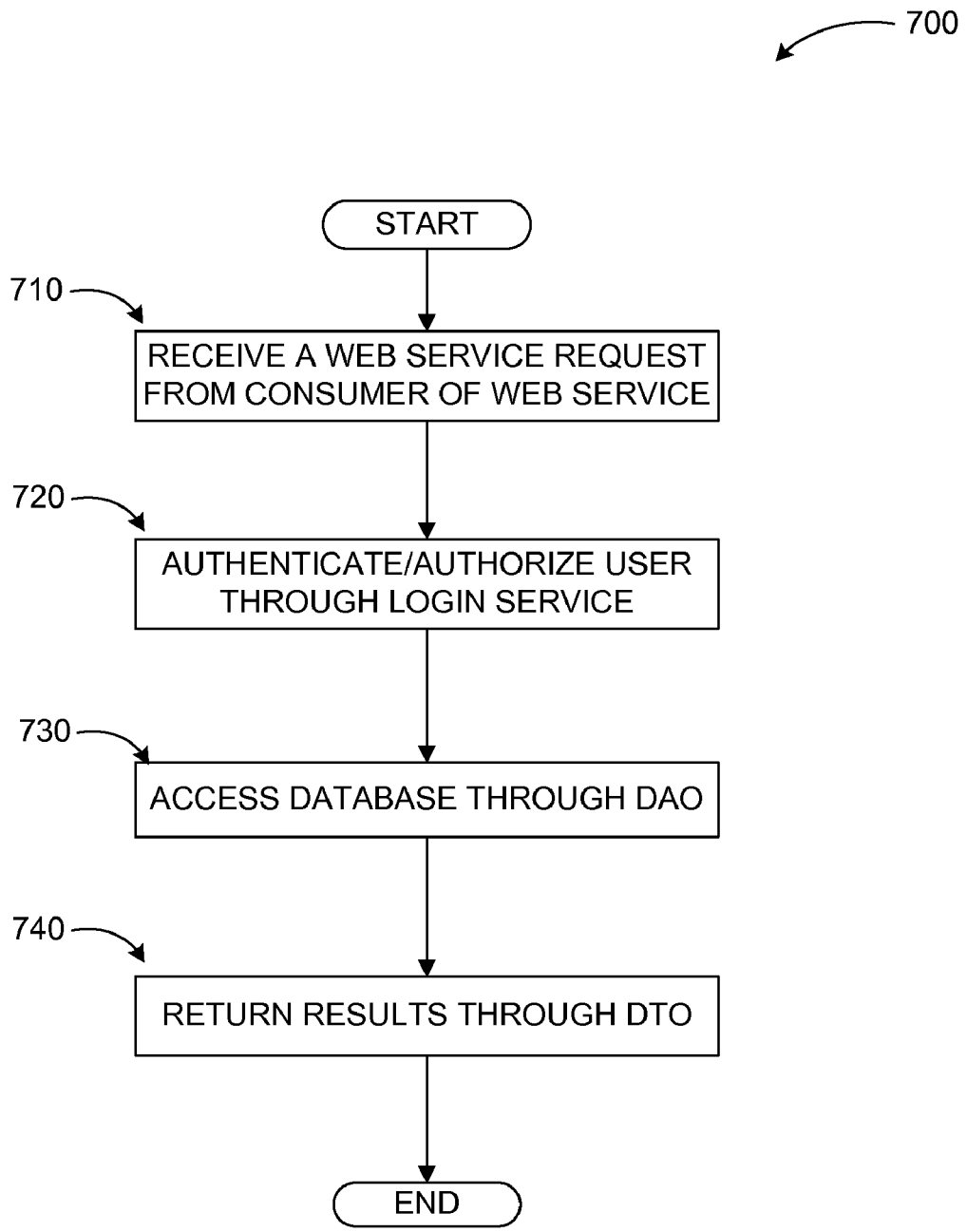
FIG. 7 illustrates a logic flow diagram for a process of implementing a scalable and extensible framework for data-driven web services according to embodiments.

FIG. 7 illustrates a logic flow diagram for process 700 of implementing a scalable and extensible framework for data-driven web services according to embodiments. Process 700 may be implemented by any web service such as the ones described above.

Process 700 begins with optional operation 710, where a web service request is received. The requesting user may be authenticates and/or authorized through one or more login services at operation 720 as discussed previously. In case of third party services within the framework, one may call the other performing authorization based on user account types. Register events and register handlers corresponding to the register events are loaded once when an event fires.

At operation 730, data associated with the requested service may be accessed (e.g. for CRUD operations) through a Data Access Object. The interaction is facilitated through a session. Each user may have multiple concurrent web service sessions. Once the DAO retrieves data from the database, a corresponding Domain Object may execute business logic by calling one or more methods and return the results to the consumer through a corresponding Data Transfer Object.

The operations included in process 700 are for illustration purposes. A layered web service framework according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for providing a scalable and extensible framework for data-driven web services, the method comprising:
    enabling consumers of web services to interact with a web service layer employing serialized Data Transfer Objects (DTOs) representing contracts of a web service;
    providing a security service to authorize the consumers for access to the DTOs using security processes including at least one from a set of: authentication; authorization, module registration, and access rights management;
    performing the security service through a security object using a singleton per service instance providing access to Data Access Objects (DAOs);
    providing a business logic layer interacting with the web service layer through Domain Objects (DOs), each DO representing a database record; and
    providing a data access layer interacting with the business logic layer employing the DAOs, each DAO encapsulating one of a database table and a database view.

2. The method of claim 1, wherein the DOs are organized into a hierarchy of conceptually related domain objects.

3. The method of claim 1, wherein the DOs expose methods for applying business logic in the business logic layer.

4. The method of claim 1, wherein the DAOs provide interfaces for performing Create, Read, Update, and/or Delete (CRUD) operations on database records.

5. The method of claim 1, wherein each DAO type populates one corresponding DO type.

6. The method of claim 1, wherein a schema of DTO hierarchy is decoupled from a schema of underlying DO hierarchy schema.

7. The method of claim 1, further comprising enabling a consumer of the web service to access the web service through a session user identity, wherein the session user identity is one of an authenticated operating system account and a web service user account.

8. The method of claim 7, wherein each session user identity is associated with a plurality of concurrent web service sessions.

9. The method of claim 1, further comprising granting web service account rights for at least one from a set of: connecting to a database, performing CRUD on the database records, and executing stored procedures by assigning a web service account to one or more database roles.

10. A server for providing a scalable and extensible framework for data-driven web services, the server comprising:
   a memory;
   a processor coupled to the memory, the processor executing one or more web services within an object based framework, wherein the framework includes:
      a data access layer connecting to one or more databases through Data Access Objects (DAOs), each DAO encapsulating one of a database table and a database view;
      a business logic layer executing business logic methods exposed by Domain Objects (DOs) on retrieved data, each DO being associated with a database record;
      a web service layer employing serialized Data Transfer Objects (DTOs) representing contracts of a web service, wherein a schema of DTO hierarchy is decoupled from a schema of underlying DO hierarchy schema;
      a security service to authorize access to the DTOs using security processes including at least one from a set of: authentication; authorization, module registration, and access rights management;
      a framework assembly exposing a base class used to build the web service, providing at least one of: a new system manager application, a change to an existing system manager application, a change to a system manager report, and delivering a command-line utility; and
      an access rights service associated with the security service providing a union of all associated web service access rights to an authenticated user for DTO access.

11. The server of claim 10, wherein the DOs define an object hierarchy of the framework as lowest level objects in the hierarchy.

12. The server of claim 10, wherein the DTOs are consumer-facing representations of the DOs.

13. The server of claim 10, wherein the web service layer includes at least two login web services and a lookup web service.

14. The server of claim 10, wherein the framework is configured to expose base classes to enable third parties build additional web services.

15. The server of claim 10, wherein a new web service session is created by inserting a web service access row in a database by a DAO.

16. The server of claim 10, wherein the DAOs employ non-public, synchronous methods to manage database connections and to execute database commands.

17. The server of claim 10, wherein the framework employs a password based protection mechanism to prevent rogue processes from gaining database access.

18. A computer-readable storage medium having instructions stored thereon for providing a scalable and extensible framework for data-driven web services, the instructions comprising:
   enabling consumers of web services to interact with a web service layer employing serialized Data Transfer Objects (DTOs) representing contracts of a web service, wherein access is provided through a session user identity that is one of an authenticated operating system account and a web service user account;
   exposing a base class used to build the web service through a framework assembly;
   providing a security service to authorize the consumers for access to the DTOs using security processes including at least one from a set of: authentication; authorization, module registration, and access rights management;
   performing the security service through a security object using a singleton per service instance providing access to Data Access Objects (DAOs);
   providing a union of all associated web services access rights to the session user identity for DTO access;
   providing a business logic layer executing business logic methods exposed by Domain Objects (DOs) on retrieved data, each DO representing a conceptual business object; and
   providing a data access layer connecting to one or more databases through the DAOs, wherein each DAO type populates one corresponding DO type and encapsulates one of a database table and a database view.

19. The computer-readable storage medium of claim 18, wherein register events and register handlers corresponding to the register events are loaded once when an event fires.

20. The computer-readable storage medium of claim 18, wherein the serialized DTO hierarchy enables lightweight transaction with each DTO being a consumer-facing representation of a corresponding DO.

* * * * *